(12) United States Patent
Södö

(10) Patent No.: US 11,575,309 B2
(45) Date of Patent: Feb. 7, 2023

(54) METHOD AND DEVICE FOR DAMPING OF LCL FILTER DURING START-UP OF AN ELECTRONIC APPLIANCE

(71) Applicant: Vacon Oy, Vaasa (FI)

(72) Inventor: Nicklas Jan Anders Södö, Vaasa (FI)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 17/391,474

(22) Filed: Aug. 2, 2021

(65) Prior Publication Data
US 2022/0037987 A1 Feb. 3, 2022

(30) Foreign Application Priority Data

Aug. 3, 2020 (DE) .......................... 102020120396.9

(51) Int. Cl.
| | | |
|---|---|---|
| *H02M 1/12* | (2006.01) | |
| *H02M 1/36* | (2007.01) | |
| *H02M 7/483* | (2007.01) | |
| *H02M 7/02* | (2006.01) | |
| *H02M 7/04* | (2006.01) | |

(52) U.S. Cl.
CPC ............ *H02M 1/126* (2013.01); *H02M 1/36* (2013.01); *H02M 7/02* (2013.01); *H02M 7/04* (2013.01); *H02M 7/483* (2013.01)

(58) Field of Classification Search
CPC .......... H02M 1/12; H02M 1/126; H02M 1/36; H02M 7/02; H02M 7/04
See application file for complete search history.

(56) References Cited

U.S. PATENT DOCUMENTS

| | | | | |
|---|---|---|---|---|
| 4,434,376 | A | | 2/1984 | Hingorani |
| 5,686,806 | A | * | 11/1997 | Hibbard ................. H02H 9/005 |
| | | | | 318/800 |
| 8,325,500 | B2 | * | 12/2012 | Schueneman ......... H02M 1/126 |
| | | | | 363/47 |
| 8,669,743 | B2 | * | 3/2014 | Rozman .................... H02J 1/02 |
| | | | | 323/224 |
| 2012/0007425 | A1 | * | 1/2012 | Rozman .................. H02J 1/102 |
| | | | | 307/25 |
| 2013/0208515 | A1 | * | 8/2013 | Swamy ................... H02M 1/36 |
| | | | | 363/37 |
| 2016/0013715 | A1 | | 1/2016 | Patel et al. |
| 2017/0324333 | A1 | | 11/2017 | Xiao et al. |

\* cited by examiner

*Primary Examiner* — Gary L Laxton
(74) *Attorney, Agent, or Firm* — McCormick, Paulding & Huber PLLC

(57) ABSTRACT

An electronic appliance such as a low harmonic drive, an active rectifier, a grid converter or any active front end or grid converter with an LCL filter. The converter is a two-level, a three-level or a multilevel inverter. The electronic appliance includes an LCL filter on a grid side of the electronic appliance and an active front end rectifier provided on a load side of the electronic appliance. The LCL filter includes grid side inductors and an active front end rectifier is connected to the LCL filter. A method for damping a corresponding electronic appliance is also disclosed.

20 Claims, 10 Drawing Sheets

METHOD AND DEVICE FOR DAMPING OF LCL FILTER DURING START-UP OF AN ELECTRONIC APPLIANCE

CROSS-REFERENCE TO RELATED APPLICATION

This application claims foreign priority benefits under 35 U.S.C. § 119 to German Patent Application No. 102020120396.9 filed on Aug. 3, 2020, the content of which is hereby incorporated by reference in its entirety.

TECHNICAL FIELD

The present invention relates to an electronic appliance, in particular a low harmonic drive, an active rectifier, a grid converter and/or any active front end or grid converter with an LCL filter. The converter may be a two-level, a three-level or a multilevel inverter. The electronic appliance comprises an LCL filter on its grid side and an active front end rectifier provided on its load side. The LCL filter comprises grid side inductors and the active front end rectifier is connected to the LCL filter. The present invention also relates to a method for damping a corresponding electronic appliance.

BACKGROUND

Electronic appliances such as low harmonic drives, active rectifiers and/or grid converters need an LCL filter on their grid sides to ensure that the PWM frequencies generated by an inverter provided in the electronic appliance are not injected into the grid. To get a good efficiency and efficient cooling of the filter, the filter is usually designed to also have low losses at PWM frequencies. This comes with a drawback with respect to immunity against grid disturbances, especially in situations in which the inverter is not modulating but the LCL filter is connected to the grid.

If there is a voltage distortion in the grid that is close to or at the resonance frequency formed by the LC-circuit on the grid side of the LCL filter and the grid impedance, then the voltage over the capacitors of the LCL filter is amplified due to low resistive losses in the filter components. This amplified voltage is then rectified through the freewheeling diodes, thyristors and/or IGBTs to the DC-link. In light distortion cases, the voltage stays under the "ready" level but in medium distortion cases, the DC-link reaches excessive values such that the inverter cannot start modulating. In severe cases the DC-link voltage may reach such high values that the inverter trips for overvoltage. When tripping for overvoltage there is a high risk that the DC-link voltage continues to increase because of light load on the DC-link. This increases the risk for degradation of DC-link capacitors' lifetime or even destruction of the DC-link capacitors.

These problems of excessive DC-voltages before start-up of the active front end modulation may be experienced in different practical situations. Typical settings comprise retrofits in the marine segment, when main propulsion is running with e.g. a cyclo-converter, which is heavily distorting the grid voltage. Another typical setting is in the mining industry with its long cabling, relatively weak grids and multi-pulse transformers.

SUMMARY

The aim of the present invention is to provide an improved electronic appliance, which avoids the excessive DC-voltages during start-up of the appliance. This aim is achieved by an electronic appliance according to claim 1 and a method for damping the LCL filter of a corresponding appliance during its start-up according to claim 9. Advantageous embodiments are subjects of the dependent claims.

According to claim 1, an electronic appliance such as a low harmonic drive, an active rectifier, a grid converter and/or any active front end or grid converter with an LCL filter is provided. The converter may be a two-level, a three-level or a multilevel inverter. The appliance comprises an LCL filter on its grid side and an active front end rectifier on its load side. The LCL filter comprises grid side inductors and the active front end rectifier is connected to the LCL filter. According to the invention, damping components are provided in parallel to the grid side inductors. The damping components are connectable to the grid side ends of the grid side inductors via switches.

To overcome the challenges described above the present invention therefore proposes to add damping components in parallel with grid side inductors of the LCL filter. These damping components are connected to the grid side ends of the grid side inductors via switches.

In a preferred embodiment of the invention, the damping components comprise damping resistors, secondary windings with a switch and/or modification of a magnetic core with a switch.

In another preferred embodiment of the invention the resistance $R_{damp}$ of the damping components is close to the impedance of the grid side inductors at the resonance frequency of the LC circuit with the grid, fulfilling the equation $$|R_{damp}| \approx |2\pi f_{res} L_{1,2,3}|,$$

preferably fulfilling the equation $$|R_{damp}| \approx (1 \pm 0,1) \times |2\pi f_{res} L_{1,2,3}|.$$

In a preferred embodiment of the invention, the damping components are only connected to the grid side ends of the grid side inductors when the electronic appliance is connected to the grid via grid switches and the active front end rectifier is not modulating.

In a preferred embodiment of the invention, the damping components are disconnected from the grid side ends of the grid side inductors as soon as the active front end rectifier has synchronized to the grid. Disconnecting the damping components minimizes the corresponding occurring losses.

In a preferred embodiment of the invention, the damping components are connected to the grid side ends of the grid side inductors during start-up of the electronic appliance for 0 ms-500 ms. Depending on the type of switches used, the resistors are in operation only between 0 ms-500 ms during a normal start-up. For example, when fast switches are used, the operation time of the resistors may be below 100 ms. Therefore, the thermal dimensioning can be quite light compared to continued operation of the damping components. This requires the drive to be disconnected from the grid shortly after the active front end rectifier stops modulating.

In a preferred embodiment of the invention, the damping components are preferably directly connected to all inductors of the LCL filter. A direct connection may be understood to comprise no other elements than conductors i.e. a conducting line connecting the damping components to the inductors of the LCL filter.

In a preferred embodiment of the invention, the resistance of the damping components is between 0.1 ohm and 100 ohm. The exact value of the resistance may depend on the precise design of the LCL filter, in particular on its inductance, wherein the inductance value is directly depending on the nominal current and voltage of the device and also the switching frequency used in the active front end rectifier. More generally speaking, the values of the resistances $R_{damp}$ may be in the range from 0.1 ohm up to several tens of ohms.

The invention is also directed at a method for damping of an LCL filter during start-up of an electronic appliance according to any of claims 1-8. The method comprises the steps of connecting the electronic appliance to the grid via grid switches;

connecting the damping components to the grid side ends of the grid side inductors via switches when the active front end rectifier is not modulating; and disconnecting the damping components from the grid side ends of the grid side inductors as soon as the active front end rectifier has synchronized to the grid.

The first two steps of the method may be carried out simultaneously or consecutively. The method may comprise additional steps corresponding to the features presently described with respect to the electronic appliance.

In a preferred embodiment of the invention, the damping components are connected to the grid side ends of the grid side inductors in a default state of the electronic appliance. The default state connection of the damping components ensures that the damping occurs immediately.

BRIEF DESCRIPTION OF THE DRAWINGS

Further details and advantages of the invention are described with reference to the following figures.

DETAILED DESCRIPTION

Figure 1:
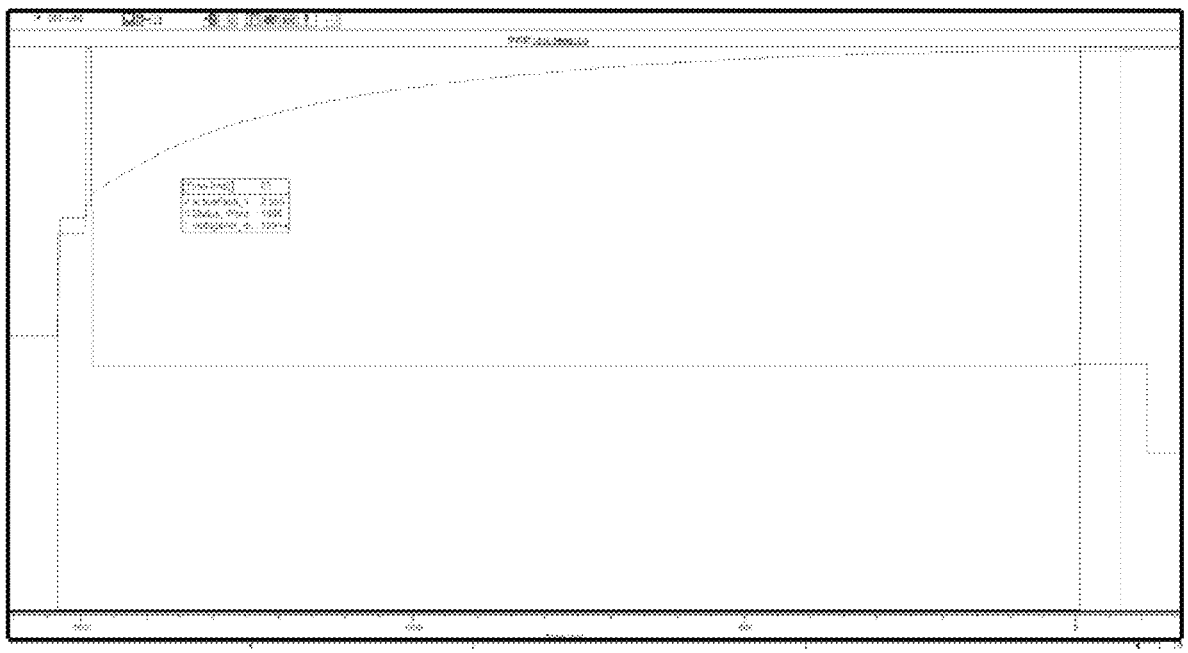
FIG. 1: voltage-time graph of the DC-link of an active front end inverter at start-up.

FIG. 1 shows a voltage-time graph of a starting active front end inverter (AFE) during highly distorted grid conditions, though within class 3 limits. The DC-link is shown to rise to almost 1300V. The rise of the DC-link may affect the appliance in undesired ways. The AFE may be part on an electronic appliance according to the present invention, wherein the appliance may be a low harmonic drive, an active rectifier and/or a grid converter or generally speaking a drive, which will be described more closely with reference to FIG. 3.

Figure 2:
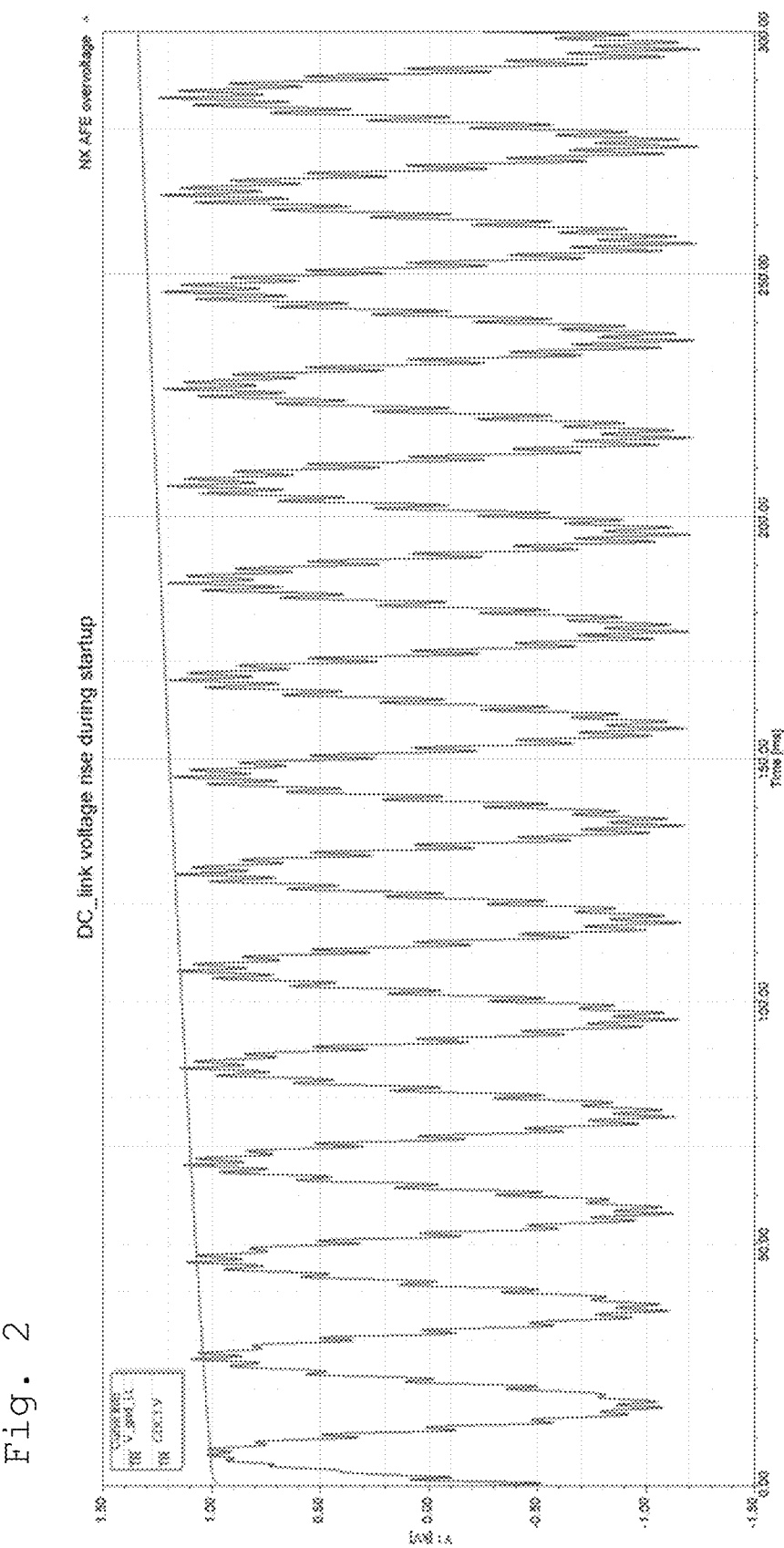
FIG. 2: voltage-time graph of the IDC-link and grid voltage of an active front end inverter at start-up.

FIG. 2 shows a simulated example of rising DC-link voltage (upper line) when grid voltage is distorted with 4.5% of the 13th harmonic. If voltage distortion is present in the grid that is close to or at the resonance frequency formed by the LC-circuit on the grid side of the LCL filter and the grid impedance, then the voltage over the capacitor of the LCL filter is amplified due to low resistive losses in the filter components. This amplified voltage is then rectified through the freewheeling diodes, thyristors and/or IGBTs to the DC-link as shown in FIG. 2. In light distortion cases, the voltage stays under the "ready" level but in medium distortion cases, the DC-link goes too high so the inverter cannot start modulating. In severe cases, the DC-link voltage may go so high that the inverter trips for overvoltage. When tripping for overvoltage there is a high risk that the DC-link voltage continues to increase because of light load on the DC-link. This increases the risk for degradation of DC-link capacitors' lifetime or may even destroy the DC-link capacitors.

Figure 3:
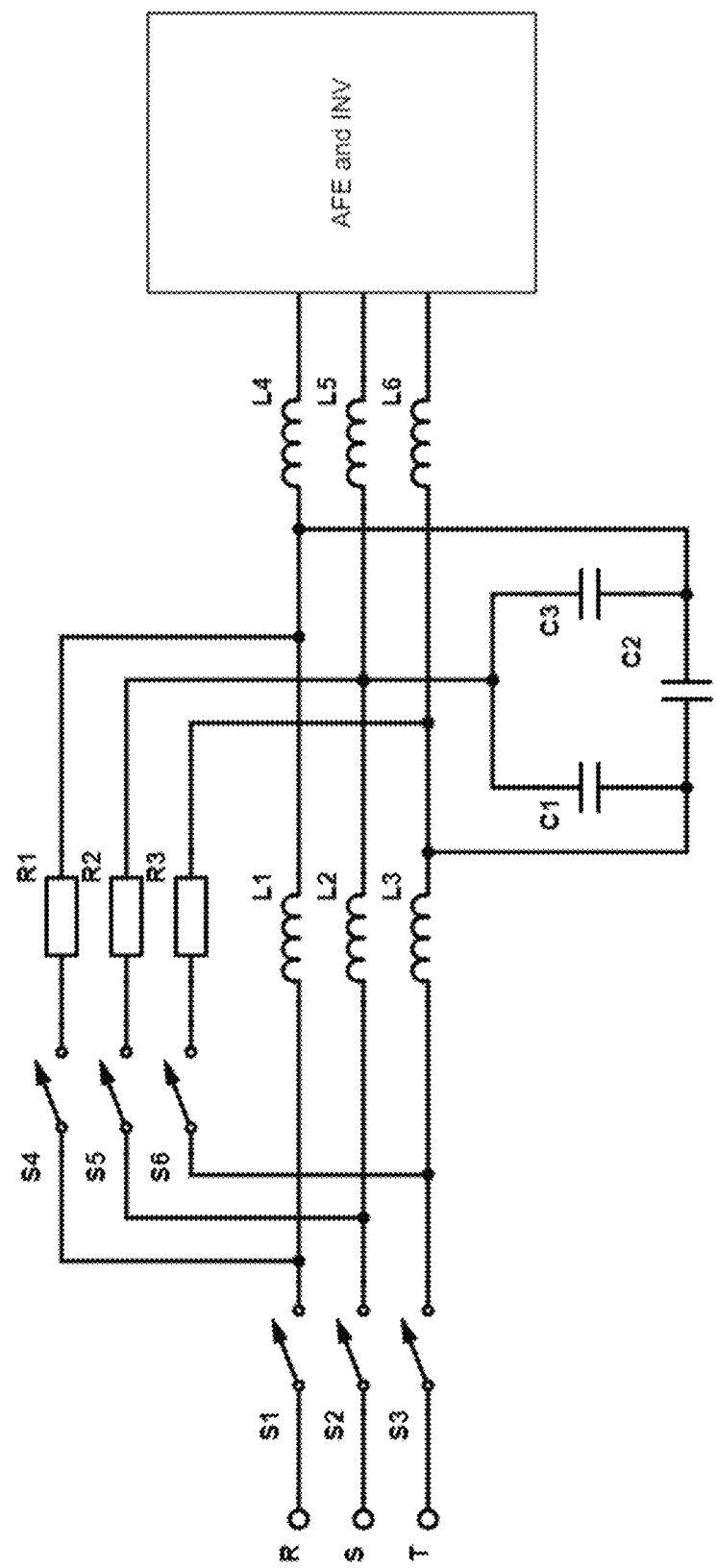
FIG. 3: circuit diagram of the electronic appliance according to the invention.

As shown in FIG. 3, in order to overcome the challenges described above, the present invention proposes to add damping components R1, R2, R3 in parallel with grid side inductors L1, L2, L3 of the LCL filter. There may be three damping components R1, R2, R3 such as resistors, which are connected to the grid R, S, T only when the electric appliance or the drive is connected to the grid and the active front end rectifier AFE is not modulating. As soon as the AFE has synchronized to the grid, the damping components R1, R2, R3 are disconnected to minimize the losses. Each of the damping components R1, R2, R3 may be connectable to one phase R, S, T of the grid on their grid side and on their load side may be permanently and directly connected to two of the capacitors C1, C2, C3 and one of the grid side inductors L1, L2, L3 and one of the load side inductors L4, L5 L6.

During a normal start-up the damping components R1, R2, R3 are in operation only 100 ms-500 ms so the thermal dimensioning can be quite light compared to continuous operation. This requires that the drive be disconnected from the grid shortly after the AFE stops modulating.

The electronic appliance shown in FIG. 3 may be a low harmonic drive, an active rectifier and/or a grid converter, comprising an LCL filter on its grid side and an active front end rectifier AFE on its load side. Additionally, an inverter INV may be provided on the load side as well. The grid side of the appliance is indicated by letters R, S, T on the left-hand side of FIG. 3, while the load side is on the right-hand side of FIG. 3.

The LCL filter comprises grid side inductors L1, L2, L3 and load side inductors L4, L5, L6. The active front end rectifier AFE is connected to the LCL filter via load side inductors L4, L5, L6. The damping components R1, R2, R3 are provided in parallel to the grid side inductors L1, L2, L3 and the damping components R1, R2, R3 are connectable to the grid side ends of the grid side inductors L1, L2, L3 via switches S4, S5, S6. The LCL filter further comprises capacitors C1, C2, C3 positioned between load side inductors L4, L5, L6 on one side and grid side inductors L1, L2, L3 on the other side.

The damping components R1, R2, R3 may comprise damping resistors, secondary windings with a switch and/or the modification of a magnetic core with a switch.

The resistances $R_{damp}$ of the damping components R1, R2, R3 may be close to the impedance of the grid side inductors L1, L2, L3 at the resonance frequency $f_{res}$ of the LC circuit with the grid, fulfilling the equation $$|R_{damp}| \approx |2\pi f_{res} L_{1,2,3}|,$$

and preferably fulfilling the equation $$||R_{damp}| \approx (1\pm 0,1) \times |2\pi f_{res} L_{1,2,3}|.$$

More generally speaking, the values of the resistances $R_{damp}$ may be in the range from 0.1 ohm up to several tens of ohms depending on the LCL design. The resistances $R_{damp}$ of the damping components R1, R2, R3 may relate to each individual resistance of the three damping components R1, R2, R3. The resistances $R_{damp}$ of the damping components R1, R2, R3 may be identical to each other.

The appliance may be designed such that the damping components R1, R2, R3 are only connected to the grid side ends of the grid side inductors L1, L2, L3 when the electronic appliance is connected to the grid via grid switches S1, S2, S3 and the active front end rectifier AFE is not modulating.

In particular, the appliance may be designed such that the damping components R1, R2, R3 are disconnected from the grid side ends of the grid side inductors L1, L2, L3 as soon as the AFE has synchronized to the grid. Hence, the damping components R1, R2, R3 may be connected to the grid side ends of the grid side inductors L1, L2, L3 during start-up of the electronic appliance for only about 0 ms-500 ms.

The damping components R1, R2, R3 are shown to be directly connected to all corresponding inductors L1, L2, L3, L4, L5, L6 of the LCL filter via the load side ends of the damping components R1, R2, R3. The connections between the load side ends of the damping components R1, R2, R3 branch such that they reach a load side end of one corresponding grid side inductor L1, L2, L3 and one corresponding load side inductor L4, L5, L6, without any intermediate components. The resistances of the damping components R1, R2, R3 may be chosen to be between 0.1 ohm and 100 ohm.

The electronic appliance is designed such that a particular method for damping its LCL filter during start-up of the appliance may be carried out. The method comprises the steps of
- connecting the electronic appliance to the grid via grid switches S1, S2, S3;
- connecting the damping components R1, R2, R3 to the grid side ends of the grid side inductors L1, L2, L3 via switches S4, S5, S6 when the active front end rectifier AFE is not modulating; and
- disconnecting the damping components R1, R2, R3 from the grid side ends of the grid side inductors L1, L2, L3 as soon as the active front end rectifier AFE has synchronized to the grid.

Figure 4:
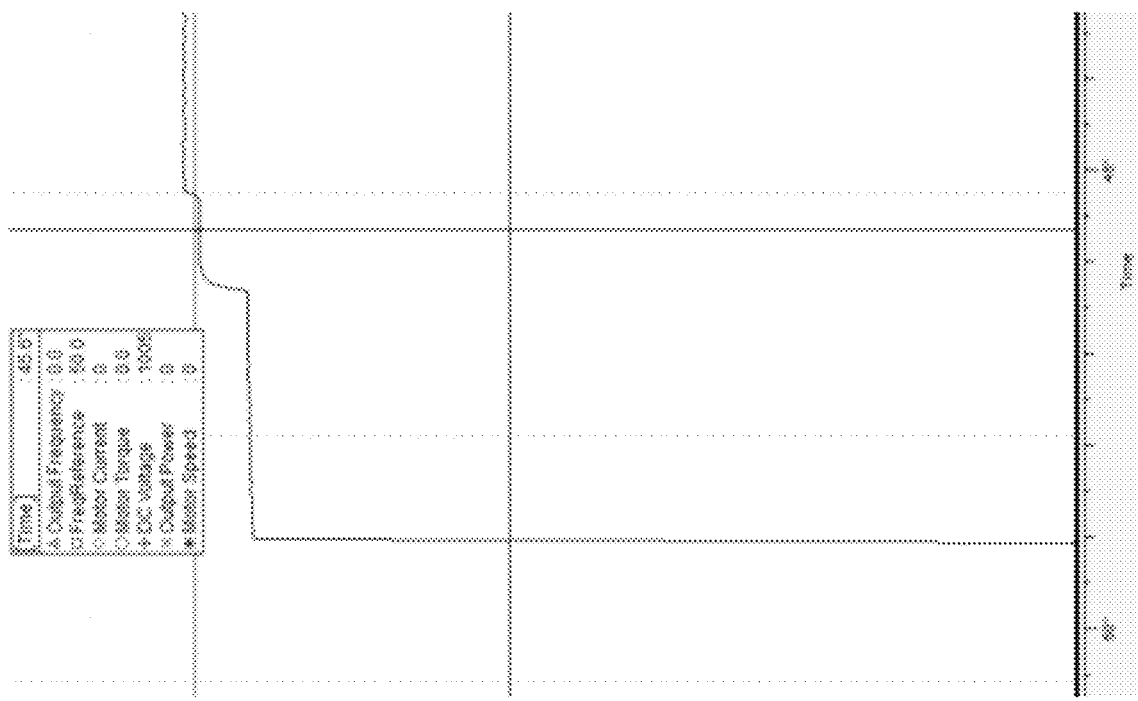
FIG. 4: voltage-time graph of the DC-link of an active front end inverter as used according to the invention at start-up.

If the start-up of the electronic appliance is carried out with the invention's design shown in FIG. 3 and includes the above-mentioned steps, the voltage-time graph shown in FIG. 4 indicates a different behaviour of the systems than is shown in FIG. 1. FIG. 4 and the following figures describe the performance characteristic of the invention's design and method. FIG. 4 shows the DC-link of a start-up situation for an electronic appliance according to the present invention. The DC-links does not rise significantly above 1000V and does stay clear of the 1300V value shown in FIG. 1.

Figure 5:
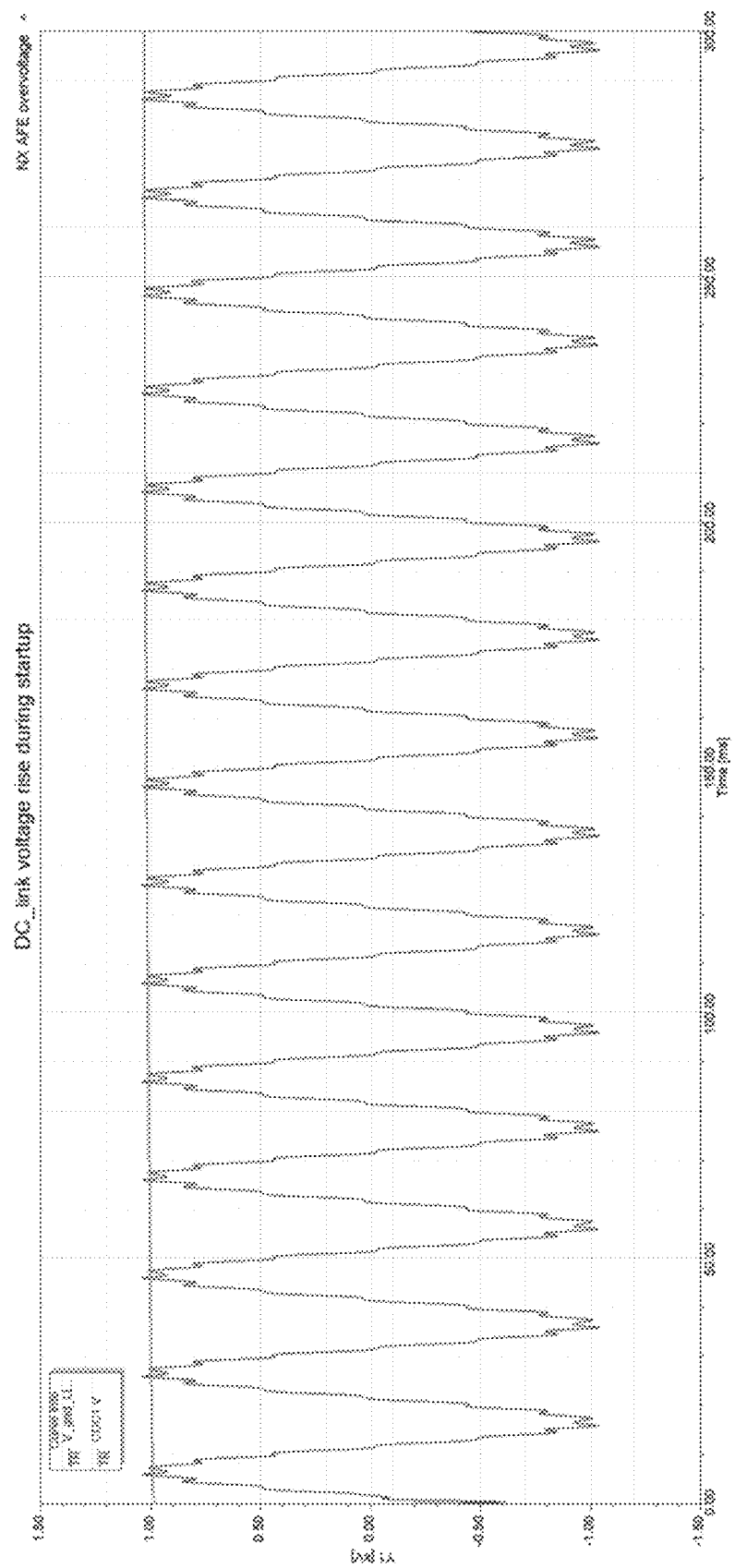
FIG. 5: voltage-time graph of the DC-link and grid voltage of an active front end inverter at start-up and with a 1 ohm resistor for damping the LCL filter.

FIG. 5 shows an example of rising DC-link voltage (upper line) when grid voltage is distorted with 4.5% of $13^{th}$ harmonic and 1 ohm resistors as damping components R1, R2, R3 are connected in parallel with the grid side inductors L1, L2, L3 as shown in FIG. 3. When the AFE shown in FIG. 3 is modulating the behaviour of the system changes because the AFE inverter is capable to actively damp possible resonances in the LCL filter. Therefore, this additional passive damping can be disconnected to improve the system efficiency and optimize the thermal dimensioning of the damping components R1, R2, R3.

Comparing FIG. 5 with FIG. 2 shows the effect of the damping components R1, R2, R3. The same grid distortion is present in both situations. Without the damping components R1, R2, R3 the voltage rises to over 1300V within 300 ms as seen in FIG. 2 but with damping components R1, R2, R3 of about 1 ohm the rise is negligible as seen in FIG. 5.

Figure 6:
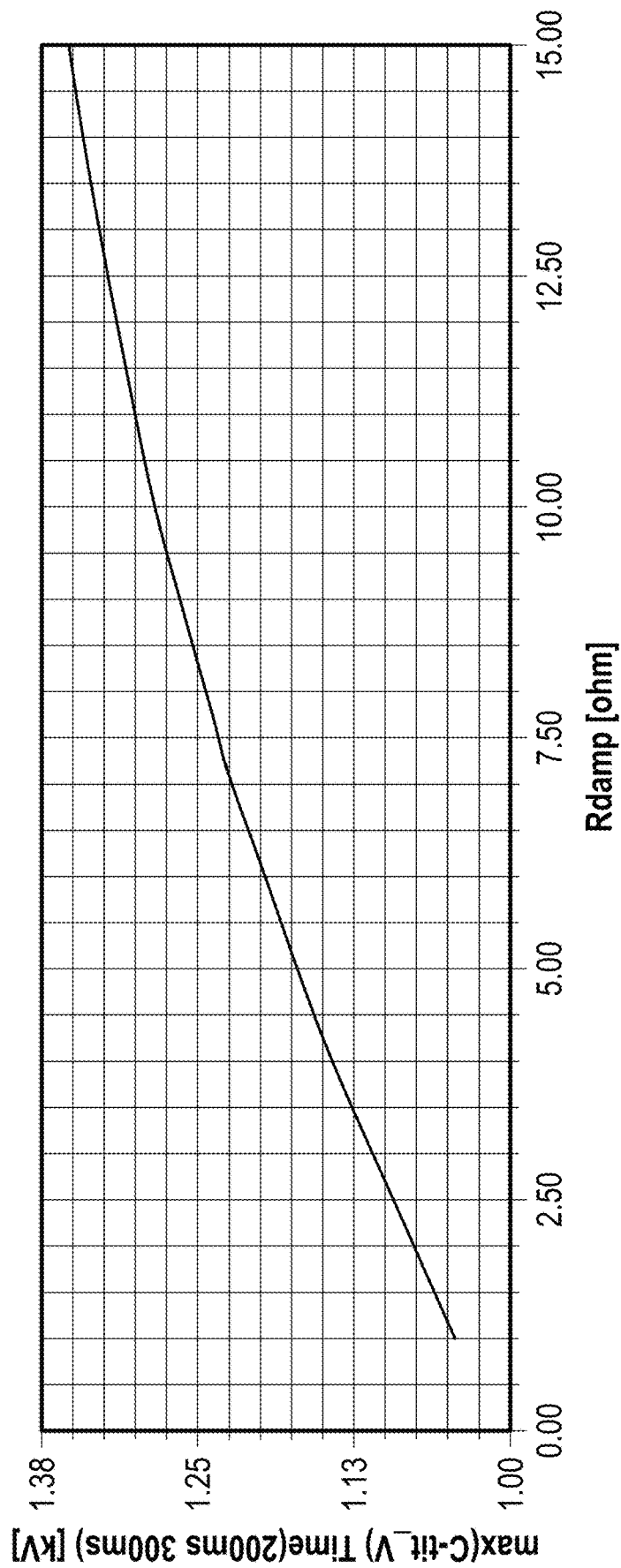
FIG. 6: peak voltage as function of resistor value at a certain grid impedance.

FIG. 6 shows the peak voltage as a function of resistor values $R_{damp}$ at a certain grid impedances.

Figure 7:
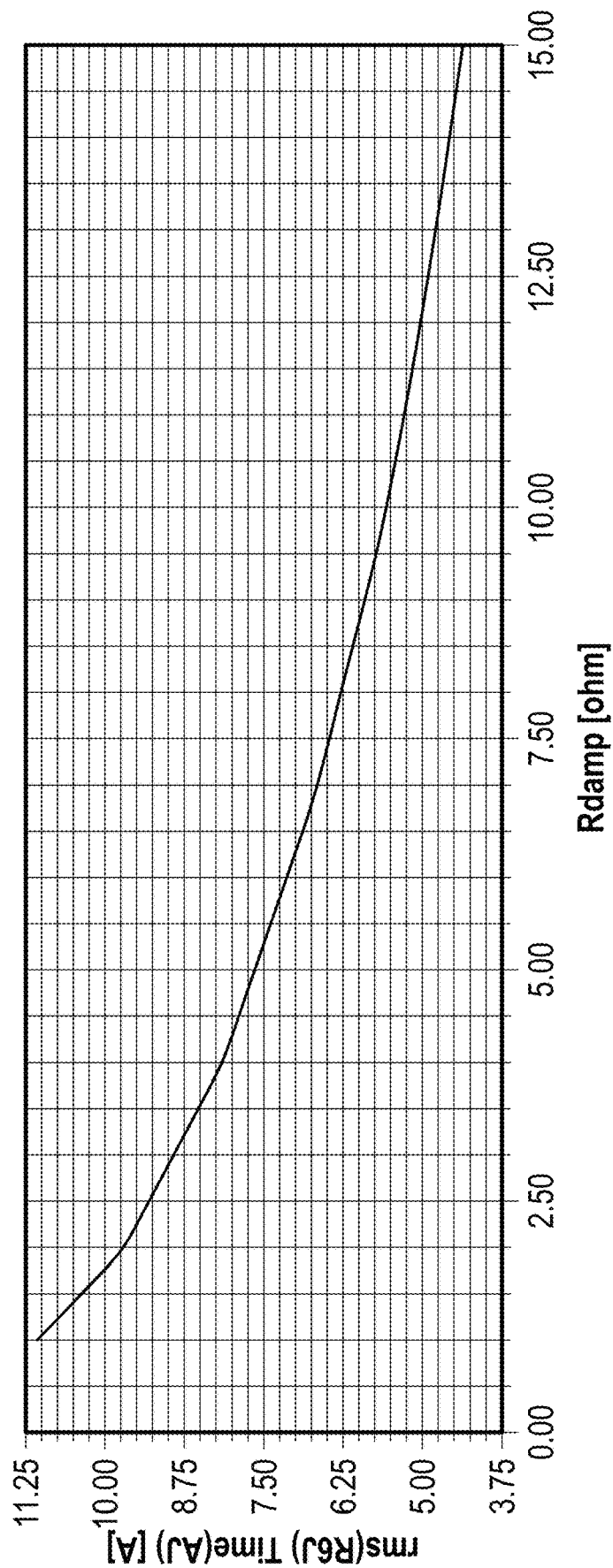
FIG. 7: RIMS current in resistor as function of resistance value.

FIG. 7 shows the RMS currents in damping components R1, R2, R3, e.g. resistors, as a function of resistance values $R_{damp}$ with ~3.6% of the 13th voltage harmonic in the grid.

Figure 8:
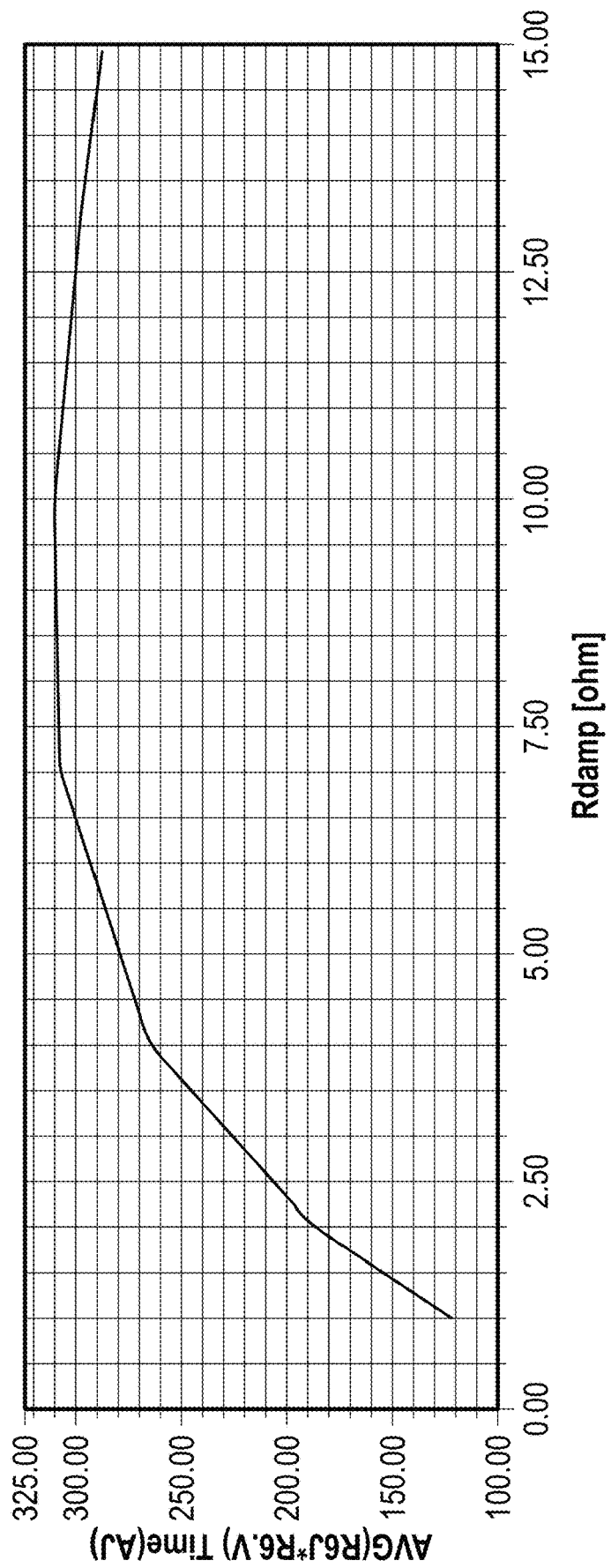
FIG. 8: power loss function of resistance value.

FIG. 8 shows power losses as a function of resistance values $R_{damp}$ with ~3.6% of the 13th voltage harmonic in the grid.

Figure 9:
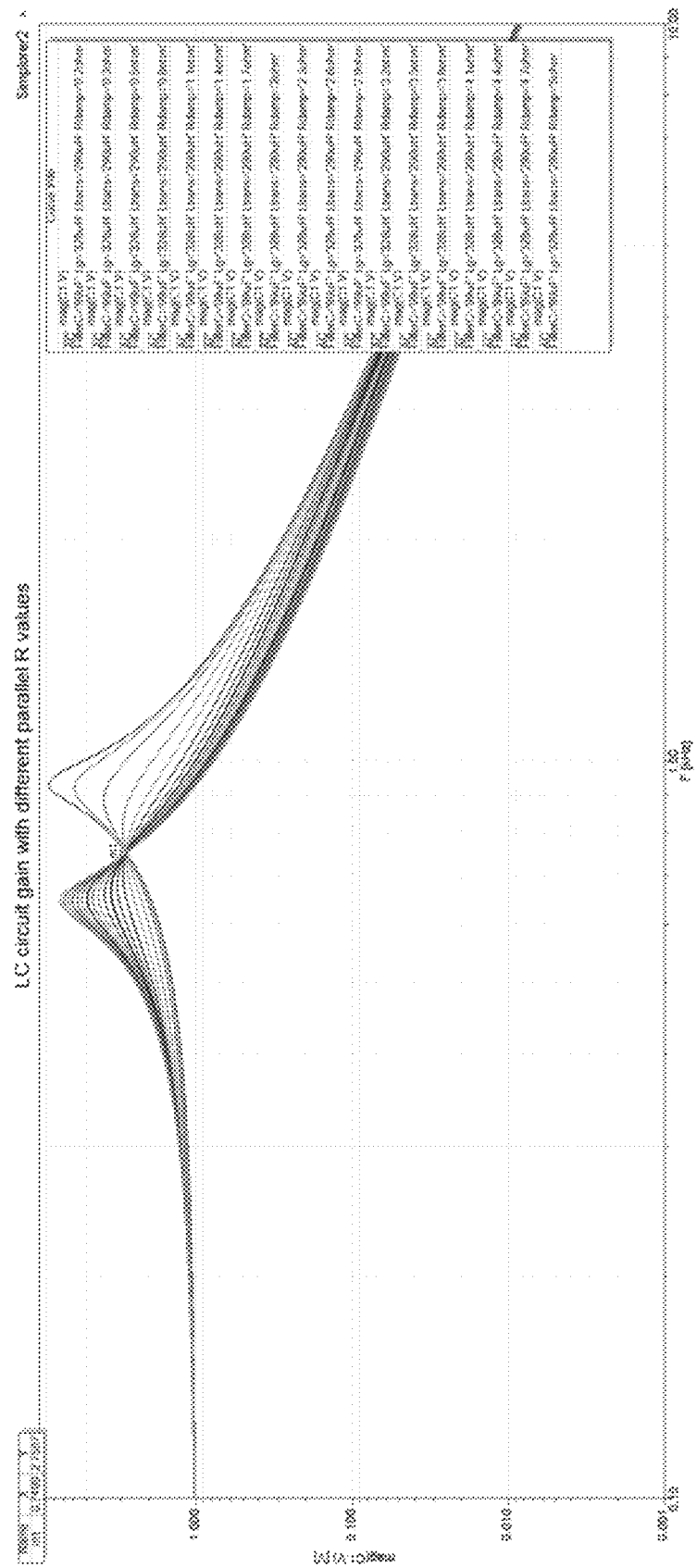
FIG. 9: simulated gain of the LC circuit.
Figure 10:
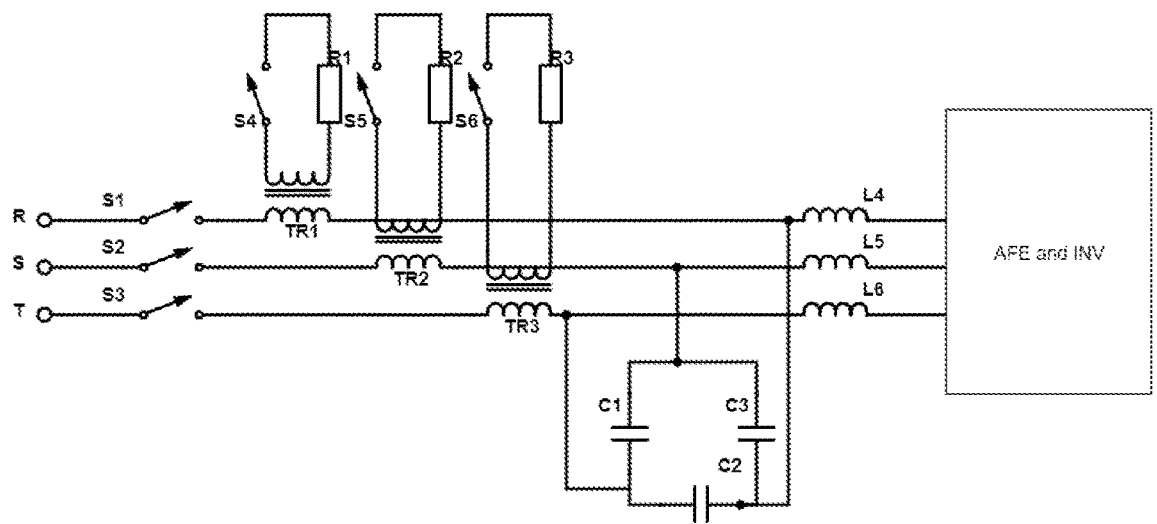
FIG. 10: circuit design of an electronic appliance according to the invention.

FIG. 9 shows simulated gains of the LC circuit. Optimum damping see ml is achieved when resistances $R_{damp}$ are close to the impedances of the inductors at the resonance frequency of the circuit. As can be seen from FIG. 9, the optimum damping is achieved when the damping resistance value is close to the impedance of the grid side inductors L1, L2, L3 at the resonance frequency of the LC circuit together with the grid, fulfilling the equation $$|R_{damp}| \approx |2\pi f_{res} L_{1,2,3}|,$$

The invention is not limited to one of the above-described embodiments, but can be modified in many ways.

All of the features and advantages arising from the claims, the description and the drawings, including constructive details, spatial arrangements and procedural steps, can be essential to the invention both individually and in the most varied of combinations.

What is claimed is:

1. An electronic appliance comprising an LCL filter on a grid side of the electronic appliance and an active front end rectifier (AFE) on a load side of the electronic appliance, wherein the LCL filter comprises grid side inductors and the active front end rectifier (AFE) is connected to the LCL filter, wherein damping components are provided in parallel to the grid side inductors, wherein the damping components are connectable to grid side ends of the grid side inductors via switches, and wherein the damping components are disconnected from the grid side ends of the grid side inductors as soon as the active front end rectifier (AFE) has synchronized to the grid.

2. The electronic appliance according to claim 1, wherein the damping components comprise damping resistors, secondary windings with a switch or the modification of a magnetic core with a switch.

3. The electronic appliance according to claim 1, wherein the resistance $R_{damp}$ of the damping components is close to an impedance of the grid side inductors $L_1$, $L_2$, and $L_3$ at a resonance frequency ($f_{res}$) of a LC circuit with the grid, fulfilling the equation $$|R_{damp}| \approx |2\pi f_{res} L_{1,2,3}|.$$

4. The electronic appliance according to claim 1, wherein the damping components are only connected to the grid side ends of the grid side inductors when the electronic appliance is connected to the grid via grid switches and the active front end rectifier (AFE) is not modulating.

5. The electronic appliance according to claim 1, wherein the damping components connected to the grid side ends of the grid side inductors during start-up of the electronic appliance for 0 ms-500 ms.

6. The electronic appliance according to claim 1, wherein the damping components are directly connected to all inductors of the LCL filter.

7. The electronic appliance according to claim 1, wherein the resistance of the damping components is between 0.1 ohm and 100 ohm.

8. The electronic appliance according to claim 2, wherein the resistance $R_{damp}$ of the damping components is close to the impedance of the grid side inductors at the resonance frequency ($f_{res}$) of the LC circuit with the grid, fulfilling the equation $$|R_{damp}| \approx |2\pi f_{res} L_{1,2,3}|.$$

9. The electronic appliance according to claim 2, wherein the damping components are only connected to the grid side ends of the grid side inductors when the electronic appliance is connected to the grid via grid switches and the active front end rectifier (AFE) is not modulating.

10. The electronic appliance according to claim 2, wherein the damping components are disconnected from the grid side ends of the grid side inductors as soon as the active front end rectifier (AFE) has synchronized to the grid.

11. The electronic appliance according to claim 3, wherein the damping components are disconnected from the grid side ends of the grid side inductors as soon as the active front end rectifier (AFE) has synchronized to the grid.

12. The electronic appliance according to claim 4, wherein the damping components are disconnected from the grid side ends of the grid side inductors as soon as the active front end rectifier (AFE) has synchronized to the grid.

13. The electronic appliance according to claim 2, wherein the damping components are connected to the grid side ends of the grid side inductors during start-up of the electronic appliance for 0 ms-500 ms.

14. The electronic appliance according to claim 3, wherein the damping components are connected to the grid side ends of the grid side inductors during start-up of the electronic appliance for 0 ms-500 ms.

15. The electronic appliance according to claim 4, wherein the damping components are connected to the grid side ends of the grid side inductors during start-up of the electronic appliance for 0 ms-500 ms.

16. An electronic appliance according to claim 1, wherein the electronic appliance is a low harmonic drive, an active rectifier, or a grid converter.

17. An electronic appliance according to claim 1, wherein the electronic appliance is an active front end or grid converter.

18. The electronic appliance according to claim 1, wherein the resistance $R_{damp}$ of the damping components is close to an impedance of the grid side inductors $L_1$, $L_2$, and $L_3$ at a resonance frequency ($f_{res}$) of a LC circuit with the grid, fulfilling the equation $$|R_{damp}| \approx (1 \pm 0,1) \times |2\pi f_{res} L_{1,2,3}|.$$

19. A method for damping of an LCL filter during start-up of an electronic appliance an LCL filter, wherein a converter is a two-level, a three-level or a multilevel inverter, comprising an LCL filter on the grid side of the electronic appliance and an active front end rectifier (AFE) on the load side of the electronic appliance, wherein an LCL filter comprises grid side inductors and an active front end rectifier (AFE) is connected to the LCL filter, wherein damping components are provided in parallel to the grid side inductors, wherein the damping components are connectable to grid side ends of the grid side inductors via switches, the method comprising the steps of
    connecting the electronic appliance to the grid via grid switches;
    connecting the damping components to the grid side ends of the grid side inductors via switches when the active front end rectifier (AFE) is not modulating; and
    disconnecting the damping components from the grid side ends of the grid side inductors as soon as the active front end rectifier (AFE) has synchronized to the grid.

20. The method according to claim 19, wherein the damping components are connected to the grid side ends of the grid side inductors in a default state of the electronic appliance.

* * * * *